US009835516B2

(12) United States Patent
Thakkar et al.

(10) Patent No.: US 9,835,516 B2
(45) Date of Patent: Dec. 5, 2017

(54) ADAPTOR FOR A CAPLESS FUEL TANK FILLER PIPE

(71) Applicant: Ford Global Technologies, LLC, Dearborn, MI (US)

(72) Inventors: Vishal Thakkar, Canton, MI (US); Ann Irene DeZelia, Milan, MI (US); Roman Schesnuk, Chesterfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 222 days.

(21) Appl. No.: 14/719,057

(22) Filed: May 21, 2015

(65) Prior Publication Data

US 2016/0341626 A1 Nov. 24, 2016

(51) Int. Cl.
*B60K 15/04* (2006.01)
*G01M 3/22* (2006.01)

(52) U.S. Cl.
CPC ............ *G01M 3/226* (2013.01); *B60K 15/04* (2013.01); *B60K 2015/047* (2013.01); *B60K 2015/0429* (2013.01); *B60K 2015/0461* (2013.01)

(58) Field of Classification Search
CPC ............ B60K 15/04; B60K 2015/0429; B60K 2015/048; G01M 3/26; G01M 3/3263
See application file for complete search history.

(56) References Cited

U.S. PATENT DOCUMENTS

| 2,714,898 | A | * | 8/1955 | Reese | B60K 15/04 137/799 |
| 4,285,230 | A | * | 8/1981 | Hartness | G01N 3/12 73/37 |
| 4,581,919 | A | * | 4/1986 | Sullivan | G01M 3/2853 73/40.5 R |
| 4,809,751 | A | * | 3/1989 | McKenzie | F16L 55/1286 138/89 |
| 5,425,266 | A | * | 6/1995 | Fournier | G01M 3/26 73/49.7 |
| 6,826,957 | B2 | * | 12/2004 | Martone | G01M 3/3236 73/40.5 R |
| 7,624,624 | B2 | * | 12/2009 | Meskouri | F02M 25/0818 73/40.5 R |
| 8,408,047 | B2 | * | 4/2013 | McCollom | B60K 15/04 137/799 |
| 9,242,552 | B2 | * | 1/2016 | McCollom | B60K 15/04 |
| 2010/0326567 | A1 | * | 12/2010 | McCollom | B60K 15/04 141/368 |

(Continued)

OTHER PUBLICATIONS

"Capless Adapter for Ford and G.M. Double-door capless Fuel Tanks," Vacutec, http://www.vacutec.com/aftermarket.html, p. 1, accessed Jul. 15, 2015.

*Primary Examiner* — David A Rogers
(74) *Attorney, Agent, or Firm* — James Dottavio; McCoy Russell LLP

(57) ABSTRACT

Methods and systems are provided for an adaptor for a capless filler pipe of a fuel tank for leak detection testing of a vehicle. In one example, the system may include a threaded hollow shaft having a top end able to receive a nozzle of a leak detection machine, the hollow shaft inserted through a mouth of a filler pipe of a fuel tank, a gasket arranged on the hollow shaft, and an end cylinder having an elastic piece on the hollow shaft configured to create an airtight seal with the fuel mouth. In this way, the adaptor may restrict gas flow through a defined flow path through the adaptor, and not through any other flow paths during leak detection testing.

12 Claims, 6 Drawing Sheets

(56) References Cited

U.S. PATENT DOCUMENTS

2013/0175268 A1\* 7/2013 McCollom ............. B60K 15/04
　　　　　　　　　　　　　　　　　　　　　220/86.2
2014/0034638 A1\* 2/2014 Whelan ................. B60K 15/04
　　　　　　　　　　　　　　　　　　　　　220/86.2
2014/0159360 A1　　6/2014 McCollom \* cited by examiner

ADAPTOR FOR A CAPLESS FUEL TANK FILLER PIPE

FIELD

The present description relates to a system and method for detecting evaporation in a capless fuel tank having a filler pipe in a motor vehicle.

BACKGROUND AND SUMMARY

A fuel system, including fuel tanks, vapor lines, and other associated components of a motor vehicle may experience cracks, holes and fissures for various reasons. For example, roadway debris, such as rocks, may hit the fuel tank when the vehicle is traveling. As another example, normal wear and tear caused, in part, by the caustic effects of gasoline may lead to mechanical degradation of the fuel system. In some cases, the degradation may be very small, and, thus, difficult to detect and locate to enable repairs to be made.

One approach to detect fuel fluid and/or vapor leaks is to generate and deliver a visible vapor, such as a perceptible smoke, to a closed fluid system and inspecting the system for any vapor escaping therefrom. As such, the visible vapor may be delivered to a fuel tank via a fuel tank filler pipe in order to pressurize the fuel tank to be tested for leaks. However, in vehicles with a capless fuel tank filler pipe, it may be difficult to reliably couple a pressure source to the throat of the filler pipe. Moreover, it may be difficult to adequately maintain the pressure in the tank to enable a pressure test to be completed if a seal between the filler pipe and the pressure source is not secure. Adaptors may be used to couple the pressure source to the capless fuel tank filler pipe of the fuel tank of a motor vehicle. An example adaptor is described by McCollom et al. in US 2014/0159360, wherein the adaptor comprises of a hollow flow body to create a continuous flow path between the pressure source and the fuel tank. McCollom further discloses a resilient seal surrounding the flow body of the adapter so as to lie between movable and stationary seal stops. A force-generating member is moved along the flow body to push the movable seal, bulging the seal outwardly towards and against the fuel mouth of the filler pipe.

The inventors herein have recognized potential issues with the aforementioned adaptor. For example, the adaptor of McCollom provides only a single seal between the fuel tank system and the leak detection test system. If the force-generating member does not install the seal correctly or securely, the visible vapor or vacuum provided during leak detection testing may escape and the leak detection test may be inaccurate. In another example, force-generating member of the adaptor of McCollom protrudes outwards from the vehicle's fuel mouth at a distance away from the fuel mouth. The outward protrusion of the adaptor may hinder the ability to run the leak detection test in certain types of vehicles, particularly in plug-in hybrid vehicles.

In one example, the issues described above may be addressed by an adaptor for a fuel tank of a vehicle, comprising a hollow shaft having a threaded top end, the hollow shaft inserted through a mouth of a filler pipe of the fuel tank, a gasket arranged on the hollow shaft, wherein a position of the rubber gasket may be adjustable only along a longitudinal length of the hollow shaft, and an end cylinder having an elastic piece threaded on the hollow shaft configured to create a seal on a fuel mouth. In this way, an airtight fluidic connection may be provided between a leak detection system and the fuel tank during EVAP testing, for example, to effectively and rapidly test the presence of leaks in a fuel system.

As one example, an elastic piece of the end cylinder may at least partially fit in an inner circumference of the fuel mouth, such that a projection of the adaptor out from the fuel mouth is reduced when the threaded top end of the hollow shaft receives a nozzle of the leak detection system. Further, the elastic piece of the end cylinder arranged within the inner circumference of the fuel mouth may create an airtight seal between the fuel mouth and the end cylinder. In this way, only a single flow path through the adaptor from the leak detection system to the fuel tank may be provided during leak detection testing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF FIGURES

FIGS. 2-4 are drawn approximately to scale.

DETAILED DESCRIPTION

Figure 1:
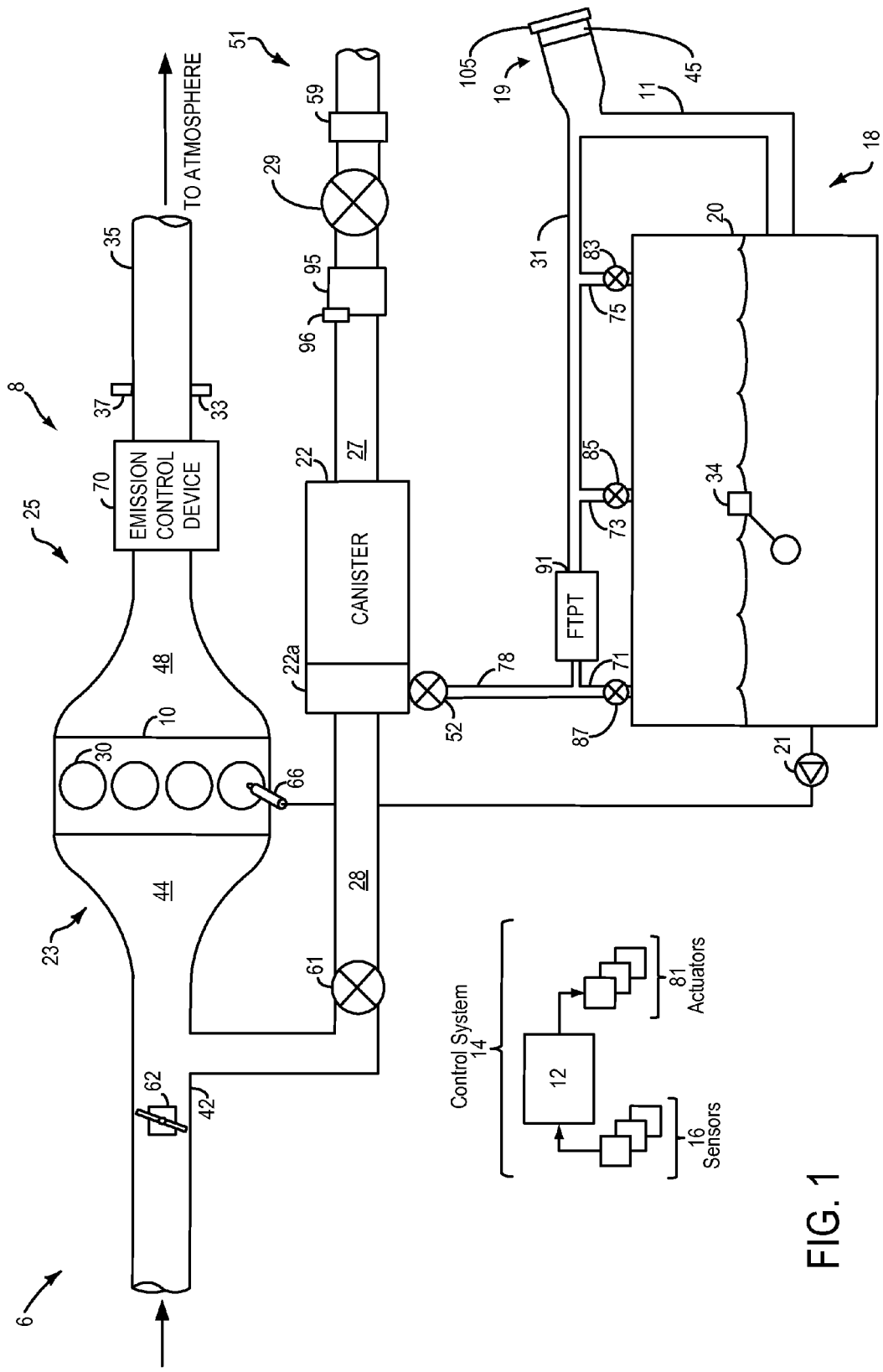
FIG. 1 shows a schematic depiction of a vehicle having an engine and a refueling assembly.
Figure 2:
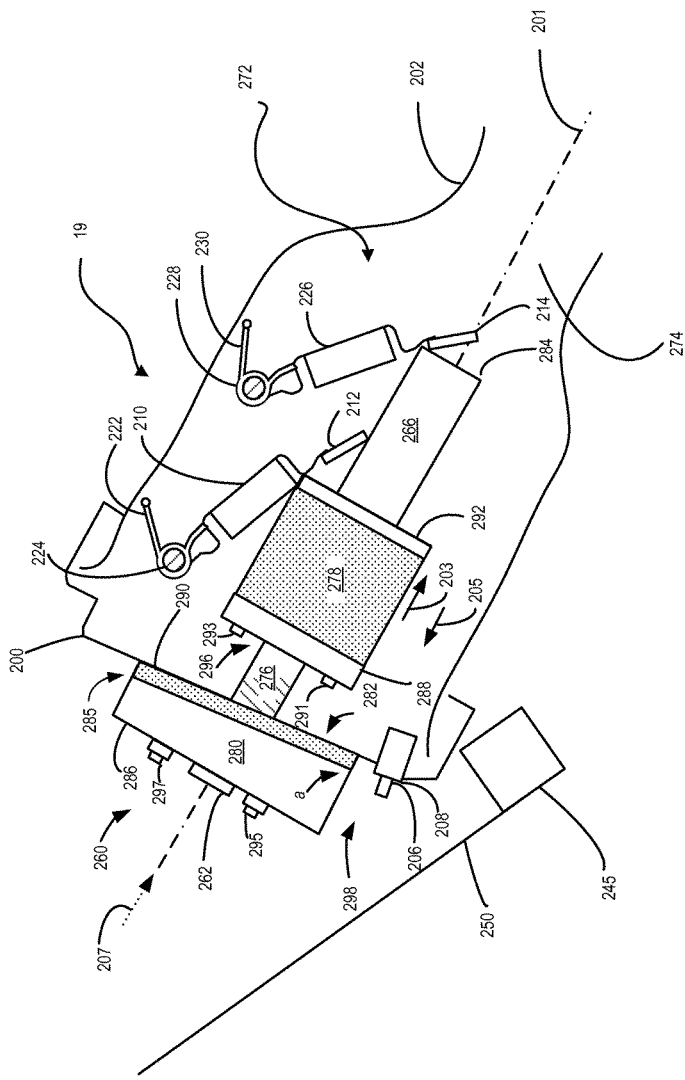
FIG. 2 shows a schematic depiction of the refueling assembly having an example adaptor for evaporation leak testing.

The present description is related systems and methods for detecting evaporation in a capless fuel tank having a filler pipe in a motor vehicle. The vehicle may include an engine and a fuel system as shown in FIG. 1. The fuel system of FIG. 1 may include a refueling assembly, wherein an adaptor may be retained in a filler pipe during evaporative leak testing, herein also referred to as EVAP testing (FIG. 2). Additional views of the adaptor are provided in FIGS. 3A and 3B. The adaptor may be installed in the filler pipe of the refueling assembly using a fastening tool illustrated in FIG. 4. An example method to install the adaptor for evaporation leak testing is provided in FIG. 6.

Referring now to FIG. 1, a schematic depiction of a vehicle system 6 is shown. The vehicle system 6 includes an engine system 8 coupled to an emissions control system 51 and a fuel system 18. Emission control system 51 includes a fuel vapor container or canister 22 which may be used to capture and store fuel vapors. In some examples, vehicle system 6 may be a hybrid electric vehicle system.

The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system. Fuel tank 20 may hold a plurality of fuel blends, including fuel with a range of alcohol concentrations, such as various gasoline-ethanol blends, including E10, E85, gasoline, etc., and combinations thereof. A fuel level sensor 34 located in fuel tank 20 may provide an indication of the fuel level ("Fuel Level Input") to controller 12. As depicted, fuel level sensor 34 may comprise a float connected to a variable resistor. Alternatively, other types of fuel level sensors may be used.

Vapors generated in fuel system 18 may be routed to an evaporative emissions control system 51, which includes a fuel vapor canister 22 via vapor recovery line 31, before being purged to the engine intake 23. Vapor recovery line 31 may be coupled to fuel tank 20 via one or more conduits and may include one or more valves for isolating the fuel tank during certain conditions. For example, vapor recovery line 31 may be coupled to fuel tank 20 via one or more or a combination of conduits 71, 73, and 75.

Further, in some examples, one or more fuel tank vent valves in conduits 71, 73, or 75. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 71 may include a grade vent valve (GVV) 87, conduit 73 may include a fill limit-venting valve (FLVV) 85, and conduit 75 may include a grade vent valve (GVV) 83. Further, in some examples, recovery line 31 may be coupled to a fuel filler system, herein also termed a refueling assembly 19. In some examples, fuel filler system may include a fuel cap 105 for sealing off the fuel filler system from the atmosphere. Refueling assembly 19 is coupled to fuel tank 20 via a fuel fill line 11.

Further, refueling assembly 19 may include refueling lock 45. In some embodiments, refueling lock 45 may be a fuel cap locking mechanism. The fuel cap locking mechanism may be configured to automatically lock the fuel cap in a closed position so that the fuel cap cannot be opened. For example, the fuel cap 105 may remain locked via refueling lock 45 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 45 may be a filler pipe valve located at a mouth of fuel fill line 11. In such embodiments, refueling lock 45 may not prevent the removal of fuel cap 105. Rather, refueling lock 45 may prevent the insertion of a refueling pump into fuel fill line 11. The filler pipe valve may be electrically locked, for example by a solenoid, or mechanically locked, for example by a pressure diaphragm.

In some embodiments, refueling lock 45 may be a refueling door lock, such as a latch or a clutch, which locks a refueling door located in a body panel of the vehicle. The refueling door lock may be electrically locked, for example by a solenoid, or mechanically locked, for example by a pressure diaphragm.

In some embodiments, refueling assembly 19 may be a capless design. In such embodiments, refueling access seal (fuel cap 105) may be considered a refueling access door located in the body panel of the vehicle and refueling lock 45 may lock the refueling access door. Refueling lock 245 may operate as described in the above examples. An example of a capless refueling system with a refueling door locking mechanism is described further herein and with regards to FIG. 2.

In embodiments where refueling lock 45 is locked using an electrical mechanism, refueling lock 45 may be unlocked by commands from controller 12, for example, when a fuel tank pressure decreases below a pressure threshold. In embodiments where refueling lock 45 is locked using a mechanical mechanism, refueling lock 45 may be unlocked via a pressure gradient, for example, when a fuel tank pressure decreases to atmospheric pressure.

Emissions control system 51 may include one or more emissions control devices, such as one or more fuel vapor canisters 22 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 51 may further include a canister ventilation path or vent line 27 which may route gases out of the canister 22 to the atmosphere when storing, or trapping, fuel vapors from fuel system 18.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 32 may be coupled to and/or within canister 22. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 27 may also allow fresh air to be drawn into canister 22 when purging stored fuel vapors from fuel system 18 to engine intake 23 via purge line 28 and purge valve 61. For example, purge valve 61 may be normally closed but may be opened during certain conditions so that vacuum from engine intake manifold 44 is provided to the fuel vapor canister for purging. In some examples, vent line 27 may include an air filter 59 disposed therein upstream of a canister 22.

Flow of air and vapors between canister 22 and the atmosphere may be regulated by a canister vent valve 29. Canister vent valve 29 may be a normally open valve, so that vapor blocking valve 52 (VBV) may control venting of fuel tank 20 with the atmosphere. VBV 52 may be positioned between the fuel tank and the fuel vapor canister, which may be fluidically coupled via conduit 78. VBV 52 may be located within canister 22. VBV 52 may be a normally closed valve, that when opened, allows for the venting of fuel vapors from fuel tank 20 to canister 22. Fuel vapors may then be vented to atmosphere via canister vent valve 29, or purged to engine intake 23 via canister purge valve 61.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open VBV 52 and canister vent valve 29 while closing canister purge valve (CPV) 61 to direct refueling vapors into canister 22 while preventing fuel vapors from being directed into the intake manifold.

Controller 12 may comprise a portion of a control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 37 located upstream of the emission control device, temperature sensor 33, and pressure sensor 91. Other sensors such as pressure, temperature, air/fuel ratio, and composition sensors may be coupled to various locations in the vehicle system 6. As another example, the actuators may include fuel injector 66, throttle 62, vapor blocking valve 52, pump 92, and refueling lock 45. The control system 14 may include a controller 12. The controller may receive input data from the various sensors, process the input data, and trigger the actuators in response to the processed input data based on instruction or code programmed therein corresponding to one or more routines. An example control routine is described herein with regard to Leak detection routines may be intermittently performed by controller 12 on fuel system 18 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 95 communicatively coupled to controller 12. ELCM 95 may be coupled in vent 27, between canister 22 and the atmosphere. ELCM 95 may include a vacuum pump for applying negative pressure to the fuel system when administering a leak test. ELCM 95 may further include a reference orifice and a pressure sensor 96. Following the applying of vacuum to the fuel system, a change in pressure at the reference orifice (e.g., an absolute change or a rate of change) may be monitored and compared to a threshold. Based on the comparison, a fuel system leak may be diagnosed.

FIG. 2 shows an example of refueling assembly 19 configured with a capless refueling assembly. Refueling assembly 19 includes a cover 200, wherein the cover 200 is configured to cover a mouth 298 and enclose components in the assembly. The refueling assembly further includes an external housing 202 configured to at least partially enclose various internal components of the refueling assembly 19. The refueling assembly 19 further includes an upstream door 210 having a hinge 224. The upstream door 210 is inset from the cover 200. A preloaded upstream spring 222 may be coupled to the upstream door 210 and the external housing 202. The preloaded upstream spring 222 is coupled to the upstream door 210 providing a return force to the door when opened. The upstream spring 222 is configured to provide a return force when the upstream door 210 is depressed via a fuel nozzle. The upstream spring 222 may be a passive spring with a fixed return force, or may be coupled to a solenoid configured to provide a greater return force when the solenoid is active. In this way, the upstream door 210 may close after a fuel nozzle is removed during a refueling event. Thus, the upstream door 210 automatically closes without assistance from a refueling operator. As a result, the refueling process may be simplified.

A seal 212 may be attached to the upstream door 210. Specifically, the seal 212 may extend around the periphery of the upstream door 210, in some examples. When the upstream door 210 is in a closed position, the seal may be in face sharing contact with the cover 200. In this way, the evaporative emissions from the refueling assembly 19 are reduced.

The refueling assembly 19 further includes a downstream door 226 positioned downstream of the upstream door 210. The downstream door 226 includes a hinge 228 and has a preloaded downstream spring 230 coupled thereto. The preloaded downstream spring 230 is coupled to the downstream door 226 providing a return force to the downstream door 226 when opened. The downstream spring 230 is also coupled to the external housing 202. The downstream spring 230 is configured to provide a return force to the downstream door 226 when the downstream door 226 is in an open position. The downstream spring 230 may be a passive spring with a fixed return force, or may be coupled to a solenoid configured to provide a greater return force when active. The downstream door 226 may also include a seal 214 (e.g., flap seal). The seal 214 may be positioned around the periphery of the downstream door 226, in some examples. The downstream door 226 enables the evaporative emissions during the refueling process to be further reduced. The downstream door 226 is arranged tangential to the fuel flow when closed, in the depicted example. However, other orientations, such as a perpendicular arranged downstream door 226, of the downstream door 226 are possible.

Refueling assembly 19 includes filler pipe 274. Filler pipe 274 is in fluidic communication with fuel tank 20 via fuel fill line 11, as shown in FIG. 1. Refueling assembly 19 may further include a flow guide (not shown) which is arranged downstream of downstream door 226. Flow guide may be at least partially enclosed by filler pipe 274. The refueling assembly 19 is configured such that a fuel-dispensing nozzle (not shown) may be inserted into a refueling inlet 272, thereby pushing in the upstream door 210 as well as the downstream door 226.

Refueling assembly includes a refueling door 250 which may be located in a body panel of the vehicle, inset such that the refueling door is flush with the body panel when closed. Refueling door 250 is coupled to a refueling door lock 245. Refueling door lock 245 may be a latch or a clutch, which locks a refueling door 250. The refueling door 550 may be electrically locked, for example by a solenoid, or mechanically locked, for example by a pressure diaphragm. As shown, the refueling door 250 is opened to allow an evaporative leak adaptor 260 to be inserted into the filler pipe 274. However, other embodiments of a position of the refueling door 250 may be possible, e.g., the refueling door 250 may be closed such that refueling door 250 is substantially over the cover 200.

In embodiments where refueling lock 245 is locked using an electrical mechanism, refueling lock 245 may be unlocked by commands from controller 12, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Refueling assembly 19 includes a refuel request button 206 coupled to a refueling door switch 208. Refuel request button 206 may be located on the refueling assembly cover 200, the refuel request button 206 configured to be depressed when a refueling operator pushes the refueling door 250 towards the refueling assembly. Refueling door switch 208 may be a spring-loaded potentiometer configured with states corresponding to refueling stages.

As shown in the depicted embodiment of FIG. 2A, an adaptor 260 having a central axis 201 may be inserted through mouth 298 into the capless filler pipe 274 of the fuel tank 20 of vehicle system 6. In one example, central axis 201 may extend through the adaptor 260 along a centerline of the fuel mouth 298 and filler pipe 274 of the refueling assembly 19. Further, adaptor 260 may be reversibly attached to the filler pipe 274 in order to create a flow path 207 (shown as dotted arrow 207) therethrough from a source of pressure or vacuum of an evaporation or vapor detection system. In other words, adaptor 260 may be coupled to the fuel tank 20 by way of the filler pipe 274 through which a gas under pressure may be supplied, or a vacuum may be drawn. In this way, the fuel tank can be tested for leaks via a conventional pressure test, a vacuum decay test, or another other suitable test. For example, a supply of gas (e.g., a visible vapor) may be introduced to the filler pipe 274 by coupling a nozzle fluidically in communication with a system for each of the aforementioned tests to identify the presence and location of a leak in the fuel tank and vapor lines and components thereof while pressure is maintained throughout the test process.

In one embodiment, the adapter 260 comprises a hollow shaft 276 and a lower body 266, wherein the hollow shaft 276 includes a threaded top end 262 at a proximal end of the hollow shaft 276, and wherein the hollow shaft 276 may be coupled to the lower body 266 at a distal end of the hollow shaft 276. In the depicted embodiment, the proximal end of the hollow shaft 276 is adjacent to and proximate a nozzle of a leak detection system (not shown) when leak testing is performed, while the distal end of the hollow shaft 276 is adjacent to and proximate the fuel tank and filler pipe 274. The hollow shaft 276 includes a central opening of the hollow shaft 276 that traverses an entirety of the hollow shaft 276. The central opening of hollow shaft 276 may align with central axis 201, and may form a first portion of flow path 207. In this way, central opening of hollow shaft 276 may allow gas to flow therethrough from a vapor generator, for example, of a leak detection system into fuel tank 20. In one embodiment, the hollow shaft 276 may comprise a series of screw threads running therearound on an outer surface of the hollow shaft 276 for a length of the hollow shaft 276 along central axis 201. In one example, the length may be a distance between the threaded top end 262 and the lower body 266 substantially aligned with central axis 201. In another example, the first longitudinal length may be a distance shorter than the distance between the threaded top end 262 and the lower body 266.

Figure 3A:
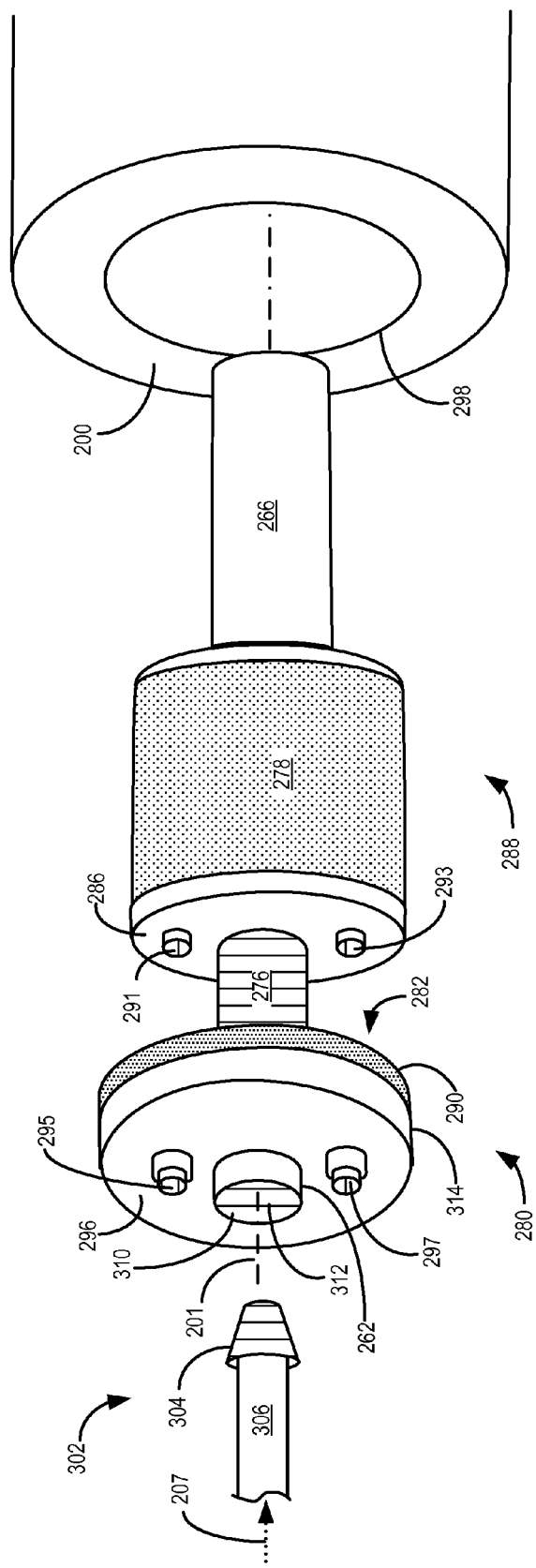
FIGS. 3A and 3B show perspective views of the example adaptor of FIG. 2.

In one embodiment, the threaded top end 262 of the hollow shaft 276 may be mechanically coupled to the nozzle of the leak detection system via a series of screw threads running therearound on an interior surface of the threaded top end 262, as shown in greater detail in FIG. 3A. The interior surface of the threaded top end 262 may be substantially aligned with central axis 201 and form a portion of the central opening of the hollow shaft 276. In this way, threaded top end 262 may receive the nozzle of the leak detection system and may allow gas to flow from a vapor generator, for example, and through the central opening of the hollow shaft 276 into fuel tank 20.

At an opposite distal end of hollow shaft 276 may be attached the lower body 266. The lower body 266 also comprises a central opening of the lower body 266 that traverses the entirety of the lower body 266 along central axis 201. The central opening of lower body 266 may also align with central axis 201, and forms a second portion of flow path 207. As such, the central opening of hollow shaft 276 and the central opening of lower body 266 may be substantially aligned. In other words, the central opening of hollow shaft 276 and the central opening of lower body 266 may each coincide with central axis 201. In this way, central opening of lower body 266 may allow gas to flow therethrough from a vapor generator, for example, of the leak detection system into fuel tank 20.

In one example, the lower body 266 may be relatively wider in diameter than a diameter of the hollow shaft 276, but relatively smaller in diameter than a diameter of the fuel mouth 298. Further, the lower body 266 mechanically coupled to the hollow shaft 276 may comprise a length along central axis 201 that may exert a force to push open one or more of the upstream door and downstream door of the refueling assembly 19 when adaptor 260 is assembled and inserted into the filler pipe 274. In other words, the lower body 266 may exert forces on a pair of normally closed, spring-biased doors (e.g., upstream door 210 and downstream door 226 positioned in the refueling assembly 19 to extend across the refueling inlet 272 and/or filler pipe 274). The lower body may be received through the open fuel mouth 298 and down the throat of the capless fuel tank filler pipe 274. In this way, the lower body 266 may be configured to open the upstream door and/or the downstream door of the refueling assembly 19. In other embodiments, the length of lower body 266 of adaptor 260 may be shortened to accommodate and be attached to a single door capless filler pipe. In one example, each of the hollow lower body 266 and the hollow shaft 276 may be manufactured from aluminum or a similar non-corrosive material.

The adaptor 260 may further include a gasket 278 arranged on the hollow shaft 276. Gasket 278 may include a central opening, described below in reference to FIG. 3B, wherein the central opening of the gasket 278 is sized to surround and be movable over the hollow shaft 276 of adaptor 260. The central axis of gasket 278 may be substantially aligned with and coaxial to central axis 201. In one embodiment, the gasket 278 may be positioned between a movable disc 288 and flange 292, described in detail below. Further, the gasket 278 may be arranged downstream from the threaded top end 262 and upstream of the lower body 266, along central axis 201.

In one example, a position of the gasket 278 may be adjustable only along a first longitudinal length of the hollow shaft 276. In other words, in one example, the position of the rubber gasket 278 may be adjusted in a first direction 203 down towards the filler pipe 274 and the fuel tank 20, and away from the fuel mouth 298. In this example, the position of the gasket 278 may be limited by a position of a flange 292. As such, the position of the gasket 278 may not be adjusted the first direction beyond the location of a stationary flange 292. In this embodiment, the stationary flange 292 is arranged at an intersection between the hollow shaft 276 and the lower body 266. In another example, the position of the rubber gasket 278 may be adjusted in a second direction 205 up towards the fuel mouth 298 and the nozzle of the leak detection system, and away from the filler pipe 274 and the fuel tank 20.

In one embodiment, the position of the gasket 278 may be adjusted by rotations of a movable disc 288 having a central opening (described below in FIG. 3B). The central opening of movable disc 288 is sized to enable the movable disk 288 to surround and slide over the hollow shaft 276 of adaptor 260 so as to be in face-to-face engagement against the gasket 278. As depicted, the movable disc 288 may be positioned upstream relative to the gasket 278 and lower body 266. Said another way, the movable disc 288 may be closer in distance to the fuel mouth 298 as compared to the gasket 278. Thus, in the assembled configuration of the adaptor 260 shown in FIG. 2, the gasket 278 may be sandwiched between the movable disc 288 and the stationary flange 292, whereby the gasket 278 may be held in surrounding coaxial alignment with the threaded hollow shaft 276 of the adaptor 260.

In some examples, the gasket 278 and the movable disc 288 may be operably coupled to each other, such that rotations of the movable disc 288 may simultaneously rotate the gasket 278 and allow the gasket 278 to move in the first direction or the second direction depending on the direction of the movable disc 288. For example, rotating the movable disc 288 in a clockwise direction may enable the gasket 278 to move in the first direction towards the lower body 266 and the fuel tank 20, and away from the fuel mouth 298. In another example, rotating the movable disc 288 in a counter clockwise direction may cause the gasket 278 to move in the second direction towards the fuel mouth 298 and the nozzle of the leak detection system, and away from the lower body 266 and the fuel tank 20. The direction of movement of the gasket 278 based on the direction of rotation of the movable disc 288 may vary depending on the configuration (e.g., direction) of the series of screw threads on the hollow shaft 276.

In one embodiment, the position of the gasket 278 may be adjusted solely along a longitudinal length of the hollow shaft 276, such as along the central axis 201 described above. In other words, the position of the gasket 278 may not be adjusted laterally relative to the central axis 201 along hollow shaft 276. For example, the position of the gasket 278 may be adjusted in the first direction 203 by applying or exerting a force via rotations of movable disc 288 on the gasket 278.

In this embodiment, rotating movable disc 288 may be achieved via a first fastener point 291 and a second fastener point 293 on a top surface 286 of the movable disc 288 using a fastening tool, discussed in detail below in FIG. 4. Similarly, the position of the rubber gasket 278 may be adjusted in the second direction 205 by rotating movable disc 288 via the first fastener point 291 and the second fastener point 293 on the top surface 286 of the movable disc 288 using the fastening tool. For example, the fastening tool may be reversibly coupled to each of the first fastener point 291 and second fastener point 293, such that a clockwise rotation of the fastening tool may adjust the movable disc 288 to move the gasket 278 in the first direction. In another example, a counter-clockwise rotation of the fastening tool may adjust the movable disc 288 to move the gasket 278 in the second direction.

In other words, movable disc 288 may be adapted to be rotated around and move axially along the hollow shaft 276 in response to a rotational force applied to the movable disc 288 via the fastener tool and the first and second fastener points 291 and 293. That is, a rotation of the movable disc 288 may cause the gasket 278 to move axially along hollow shaft 276 so as to move either closer to or away from the flange 292 depending upon a direction in which the movable disc 288 is rotated. The stationary flange 292 may be provided to surround the hollow shaft 276 at the intersection of the threaded hollow shaft 276 and the lower body 266. The flange 292 may act as a lower stop seal to prevent gasket 278 from moving in the first direction 203 beyond a desired point (e.g., at a location where lower body 266 is arranged).

As such, the gasket 278 may be adjusted to a position wherein the gasket 278 may provide an airtight seal with one or more walls forming the filler pipe 274 and refueling inlet 272. Thus, a diameter of the gasket 278 may be substantially similar to a width of the filler pipe 274 and/or the refueling inlet 272. In another example, the gasket 278 may provide an airtight seal with one or more of the upstream door 210 and downstream door 226, when the adaptor 260 is inserted into the filler pipe 274 and one or more of the upstream door 210 and downstream door 226 are opened. In other words, gasket 278 may serve as a plug in the refueling assembly 19 by restricting gas flow only through the defined flow path 207 through adaptor 260, and not through any other flow paths when adaptor 260 is substantially positioned and fastened via the aforementioned fastener points (e.g., first fastener point 291 and second fastener point 293) within refueling assembly 19 during leak detection testing.

The gasket 278 may be manufactured from a resilient, stiff, and/or fuel-resistant material (e.g., rubber), which may be responsive to a compressive force exerted along central 201 by movable disc 288. In this way, an airtight seal may form between the rubber gasket 278 and filler pipe 274, refueling inlet 272, and/or one or more doors (e.g., upstream door 210 and/or downstream door 226). In an embodiment, the central opening of gasket 278 may be sized to enable the gasket 278 to surround and move over the threaded hollow shaft 276 of the adaptor 260 so as to be in face-to-face engagement against the flange 292.

Figure 3B:
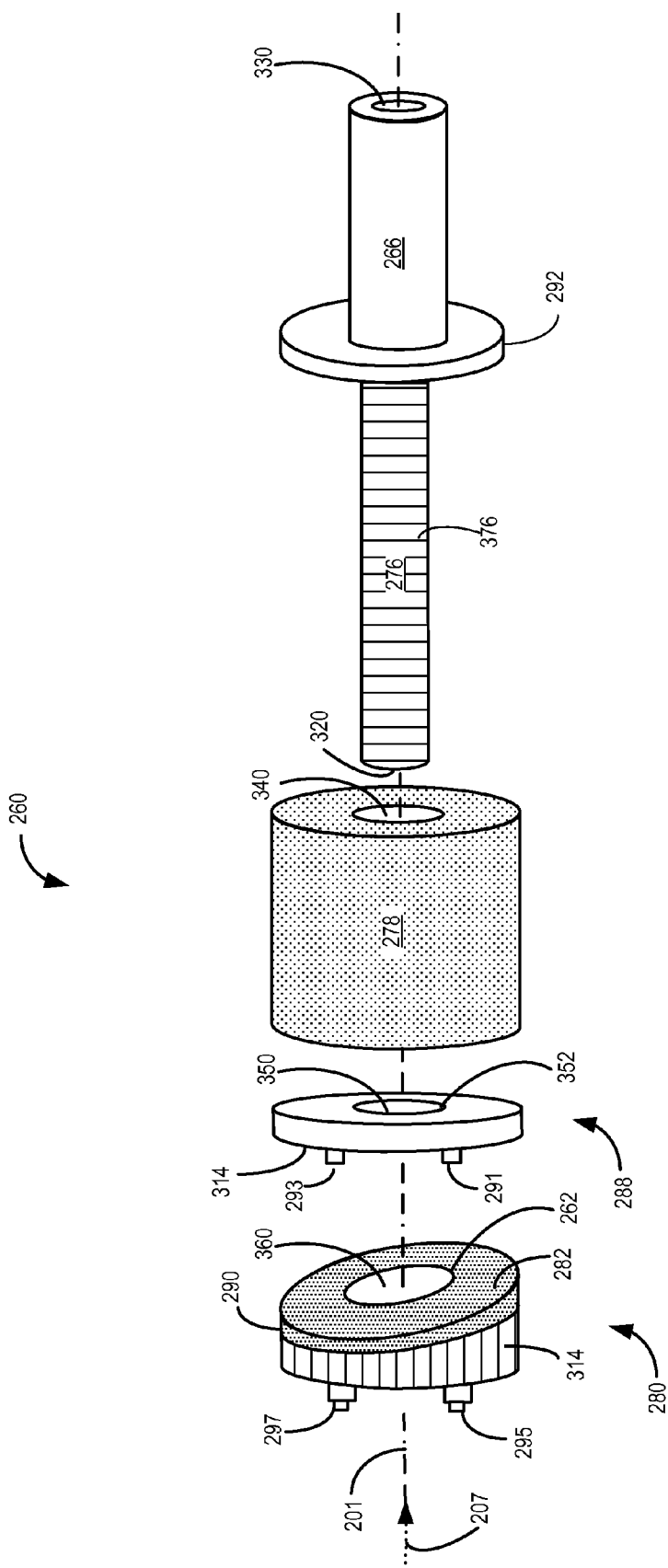

The adaptor 260 may further comprise movable end cylinder 280 having elastic piece 290 and a central opening (discussed in FIG. 3B). In one embodiment, end cylinder 280 may be arranged at the proximal end of the hollow shaft 276 in proximity to the fuel mouth 298 and nozzle of the leak detection system when leak testing is performed compared to the downstream movable disc 288 and gasket 278. Further, the end cylinder 280 may be positioned between the threaded top end 262 and the movable disc 288. In one example, the elastic piece 290 may comprise rubber. In another example, the elastic piece 290 may comprise another resilient, durable, and heat resistant elastic material, such as elastomers.

In an embodiment, the central opening of end cylinder 280 may be sized to enable the end cylinder 280 to surround and move over the threaded hollow shaft 276 of the adaptor 260 so as to be in face-to-face engagement against an inner circumference of fuel mouth 298. The end cylinder 280 may be operably coupled to hollow shaft 276 via threading of an inner circumference of end cylinder 280 onto the hollow shaft 276. In one embodiment, a lower end 285 of the end cylinder 280 may be angled relative to central axis 201, as shown in FIG. 2 and FIG. 3B. For example, cylinder 280 may comprise a trapezoidal cross-section. In one example, the lower end 285 of the end cylinder 280 may include dimensions substantially complementary to the dimensions of an opening of the fuel mouth 298 when the adaptor 280 is assembled and inserted into the filler pipe 274. For example, an angle a at the lower end 285 of the end cylinder 280 may comprise an angle of 80 degrees. In another example, an angle 'a' at the lower end 285 of the end cylinder 280 may comprise an angle between 70 and 90 degrees. In this way, the lower end 285 including the elastic piece 290 may be angled such that when the adaptor 260 is inserted through the fuel mouth 298 into the filler pipe 274 during leak testing, the lower end 285 of the end cylinder 280 may form an airtight seal against the fuel mouth 298 of the refueling assembly 19. In other words, a surface of the lower end 285 facing the fuel mouth 298 should be substantially parallel to a face-sharing plane of the fuel mouth 298 and cover 200 of refueling assembly 19.

Consequently, in one example, when the adaptor 260 is inserted through the fuel mouth 298 into the filler pipe 274, a bottom surface 282 at the lower end 285 of the elastic piece 290 of end cylinder 280 may be in face-sharing contact with an inner circumference of fuel mouth 298. As a result, an airtight seal between the end cylinder 280 and the fuel mouth 298 may be formed. In another example, when the adaptor 260 is inserted through the fuel mouth 298 into the filler pipe 274, elastic piece 290 of end cylinder 280 may be substantially within the fuel mouth 298, thus, forming an airtight seal between the end cylinder 280 and the fuel mouth 298 of the refueling assembly 19. In this way, the end cylinder 280 having the elastic piece 290 may act as a plug to enable fluidic communication substantially between the fuel system 18 and the leak detecting system when each of the refueling assembly 19 and the leak detecting system are coupled to the adaptor 260 as described.

In an embodiment, an axial force along central axis 201 may be exerted on elastic piece 290 of end cylinder 280 to create a compressive force delivered to fuel mouth 298 in order to form the airtight seal. As such, similar to movable disc 288, the position of the end cylinder 280 may be adjusted in the first direction 203 along central axis 201 by rotating end cylinder 280 via a third fastener point 295 and a fourth fastener point 297 on a top surface 296 of the end cylinder 280, as shown in FIG. 2A. Similarly, the position of the end cylinder 280 may be adjusted in the second direction 205 along central axis 201 by rotating end cylinder 280 via the third fastener point 295 and the fourth fastener point 297 on the top surface 286 of the end cylinder 280. As such, the end cylinder 280 may be adjusted to a position wherein the end cylinder 280 may provide an airtight seal with the fuel mouth 298. In one example, the rotation of end cylinder 280 may be achieved using the fastener tool, discussed later in reference to FIG. 4. In other words, end cylinder 280 may serve as a plug allowing gas flow only through the continuous flow path 207 of adaptor 260, and not through any other flow paths when adaptor 260 is substantially positioned and fastened via the aforementioned fastener points within refueling assembly 19 for leak testing. Said another way, the end cylinder 280 having the elastic piece 290 may act as a plug to enable fluidic communication substantially between the end cylinder 280 and the leak detecting system when each of the refueling assembly 19 and the leak detecting system are coupled to the adaptor as described.

In one embodiment, locations of the first fastener point 291 (on a top surface of movable disc 288) and third fastener point 293 (on a top surface of end cylinder 380) may be substantially the same in relation to a tangential distance from the central axis 201. Similarly, locations of the second fastener point 293 (on a top surface of movable disc 288) and fourth fastener point 295 (on a top surface of end cylinder 380) may be substantially similar in relation to a tangential distance from the central axis 201. As such, each of a length between the first fastener point 291 and the second fastener point 293, and a length between the third fastener point 295 and fourth fastener point 297 may be substantially the same.

In sum, the flow path 207 (shown as dotted line 207 in FIG. 2A) may be established through the threaded top end 262, hollow shaft 276, and lower body 266 of adapter 260 into the filler pipe 274 of refueling assembly 19. In one embodiment, the continuous flow path 207 may be substantially aligned with central axis 201, such that each of the threaded top end 262, hollow shaft 276, and lower body 266 substantially aligns and is coaxial with central axis 201.

Thus, in one embodiment, an adaptor for a vehicle may be provided, comprising a hollow shaft having a threaded top end, the hollow shaft inserted through a mouth of a filler pipe of a fuel tank, a gasket arranged on the hollow shaft, wherein a position of the gasket is adjustable only along a longitudinal length of the hollow shaft, and an end cylinder having an elastic piece threaded on the hollow shaft to create a seal with the fuel mouth.

In one example, the position of the gasket along the longitudinal length of the hollow shaft may be adjusted via a movable disc threaded on the shaft, the movable disc configured to rotate and exert a force on the gasket. As such, the movable disc may exert the force on the rubber gasket via rotations at one or more fastener points on a top surface of the movable disc using the fastening tool. Further, the hollow shaft may be operably coupled to a lower body, and wherein the hollow shaft and lower body coupled together comprise a length sufficient to engage and displace an upstream door and a downstream door positioned across the filler pipe.

In one embodiment, the threaded top end of the hollow shaft may include a series of interior screw threads on an inner surface of the threaded top end. In this way, the threaded top end of the hollow shaft may receive a nozzle of a leak detection system. Moreover, the hollow shaft may include a series of exterior screw threads on an outer surface of the hollow shaft.

In addition, the end cylinder having the elastic piece may be angled at a lower end of the end cylinder forming the seal within the fuel mouth. As such, the end cylinder having the elastic piece may be adjusted to rotate along the hollow shaft, such that the elastic piece of the end cylinder may be fastened within the fuel mouth. Specifically, the elastic piece may be fastened in the fuel mouth via one or more fastener points on a top surface of the end cylinder having the elastic piece using the fastening tool.

Now turning to FIG. 3A is a front perspective view of the adaptor 260 that may be removably attached to a capless fuel tank filler pipe 274 of refueling assembly 19 via a nozzle 304 of a leak detection system 302, such that a source of pressure using a vapor and/or vacuum may be connected to the fuel tank 20 for leak testing. In another embodiment, instead of pressurizing the fuel tank with a vapor, an alternative source of suitable gas (e.g., air or nitrogen) can be supplied to the adaptor to fill the fuel tank. In this way, gas will pressurize the fuel tank to enable leaks to be detected by means of a conventional pressure decay test, for example. In yet another embodiment, a source of vacuum may be connected to the adapter. As such, in this example, a suction path substantially following central axis 201 may be established from the fuel tank to the vacuum source via the filler pipe 274, the adaptor 260, the nozzle 304, and the pressure/vacuum, supply hose 306 in order to enable leaks to be detected by means of a conventional vacuum decay test.

In one example, nozzle 304 of leak detection system 302 may be threaded, such that the nozzle 304 may be threaded into threaded top end 262 of adaptor 260. Thus, a pressure or a vacuum may be delivered directly to the adaptor 260 without any intermediate coupler located between the adapter and the pressure or vacuum source. In an alternative example, a separate connector piece, such as a tube or a knurled adaptor piece, may be coupled to each of the nozzle 304 and/or the adaptor 260 to allow fluidic communication between the refueling assembly 19 and the leak detection system 302.

The threaded top end 262 may be coupled to a first end of nozzle 304 of the leak detection system 302 via threading of the nozzle 304 into a series of screw threads 312 on an internal surface 310 of the threaded top end 262 of adaptor 260, as discussed in reference to FIG. 2. The nozzle 304 may also be coupled to a pressure/vacuum supply hose 306 via an opposite, second end of the nozzle 304, as shown in FIG. 3A. The pressure/vacuum supply hose 306 may be coupled to a source of pressure or to a source of vacuum (not shown). Therefore, a vapor or gas may be delivered under pressure to or a vacuum can be created within the fuel tank 20 and its associated vapor lines (e.g., vapor recovery line 31, conduit 71, conduit 73, and/or conduit 75) by way of the continuous flow path 207. As discussed in reference to FIG. 2, the continuous flow path 207 along central axis 201 may be established through adaptor 260 between the pressure or vacuum source and the filler pipe 274 of the fuel tank 20.

As discussed in reference to FIG. 2, the first fastener point 291 and/or the second fastener point 293 may be mechanically coupled to the top surface 286 of the movable disc 288. Similarly, the third fastener point 295 and/or the fourth fastener point 297 may be mechanically coupled to top surface 296 of end cylinder 380. In one example, top surface 286 of the movable disc 288 may be proximate to the nozzle 304 and the threaded top end 262 as compared to an opposite, second surface of the movable disc 288 facing the gasket 278. Likewise, top surface 296 of end cylinder 380 may be at a proximal end of the adaptor 260, such that the top surface 296 faces nozzle 304 and the fuel mouth 298. Further, the top surface 286 of the movable disc 288 and top surface 296 of the end cylinder 280 may be each be parallel to one another when the adaptor 260 is assembled and positioned into the refueling assembly 19 for leak testing.

In one embodiment, one or more of the aforementioned fastener points (e.g., first fastener point 291 and second fastener point 293 of the movable disc 288, and third fastener point 295 and fourth fastener point 297 of end cylinder 280) may protrude or extend for a given distance away from the top surface of the respective component (e.g., movable disc 288 for first fastener point 291 and second fastener point 293, and end cylinder 280 for third fastener point 295 and fourth fastener point 297) as shown in FIGS. 2-3. In another embodiment, each of the fastener points may be integral within its respective component, such that no protrusions or projections are present on the top surface of the end cylinder 280 and/or the movable disc 288. In one example, one or more of the fastener points (e.g., first fastener point 291 and second fastener point 293 of the movable disc 288, and third fastener point 295 and fourth fastener point 297 of end cylinder 280) may be threaded on an internal surface. In another embodiment, each of the fastener points may be an annular aperture. As will be discussed in FIG. 4, depending on the configuration of the fastener points, prongs of the fastening tool configured to reversibly engage with and manipulate each of the fastener points may be shaped to be complementary to each of the fastener points.

FIG. 3B illustrates an exploded back perspective view of an example unassembled adaptor that may be removably attached to a capless fuel tank filler pipe 274 of refueling assembly 19, such that a source of pressure and/or vacuum may be connected to the fuel tank 20 for leak testing. In one embodiment, the hollow shaft 276 comprises a series of screw threads 376, of which each of the gasket 278, movable disc 288, and/or end cylinder 280 may be threaded onto. As such, each of the gasket 278, movable disc 288, and/or end cylinder 280 may include a series of screw threads complementary to the series of screw threads 376 on hollow shaft 276.

The hollow shaft 276 includes a central opening 320 may traverse the entire longitudinal length of the hollow shaft 276. The central opening 320 of hollow shaft 276 may align with central opening 330 of lower body 266 along central axis 201. Thus, the central openings of the hollow shaft 276 and the lower body 266 may each form flow path 207. In this way, central opening 320 of hollow shaft 276 and central opening 330 of lower body 266 may allow gas to flow therethrough from a vacuum or vapor generator, for example, of leak detection system 302 into fuel tank 20.

Further, as described in FIG. 2, gasket 278 may include a central opening 340, wherein the central opening 340 may be sized to surround and be movable over hollow shaft 276 of adaptor 260. A central axis of central opening 340 of gasket 278 may be substantially aligned with and coaxial to central axis 201.

As described above, the position of the gasket 278 may be adjusted by rotations of movable disc 288 having a central opening 350. In one embodiment, an inner circumference 352 of movable disc 288 forming central opening 350 may be include a series of screw threads to allow threading of the movable disc 288 on hollow shaft 276. The central opening 350 of movable disc 288 may be sized to enable the movable disc 288 to surround and be moved over the hollow shaft 276 of adaptor 260 so as to be in face-to-face engagement against the gasket 278.

The adaptor 260 may further comprise movable end cylinder 280 having elastic piece 290 and a central opening 360. In an embodiment, the central opening 360 of end cylinder 280 may be sized to enable the end cylinder 280 to surround and move over the threaded hollow shaft 276 of the adaptor 260 so as to be in face-to-face engagement against fuel mouth 298. In one embodiment, the end cylinder 280 may be operably coupled to hollow shaft 276 via threading on an inner circumference 362 of end cylinder 280 onto the hollow shaft 276.

As such, each of the gasket 278, movable disc 288, and/or end cylinder 280 may be threaded onto threaded hollow shaft 276. In other embodiments, each of the gasket 278, movable disc 288, and/or end cylinder 280 may be retained onto hollow shaft 276 by other means, such as by friction and/or another fastening mechanism. When adaptor 260 is fully assembled, as shown in FIG. 2, central opening 320 of hollow shaft 276 and central opening 330 of lower body 266 may allow gas to only flow therethrough from a vacuum or vapor generator, for example, of leak detection system 302 into fuel tank 20 for leak detection testing.

Figure 4:
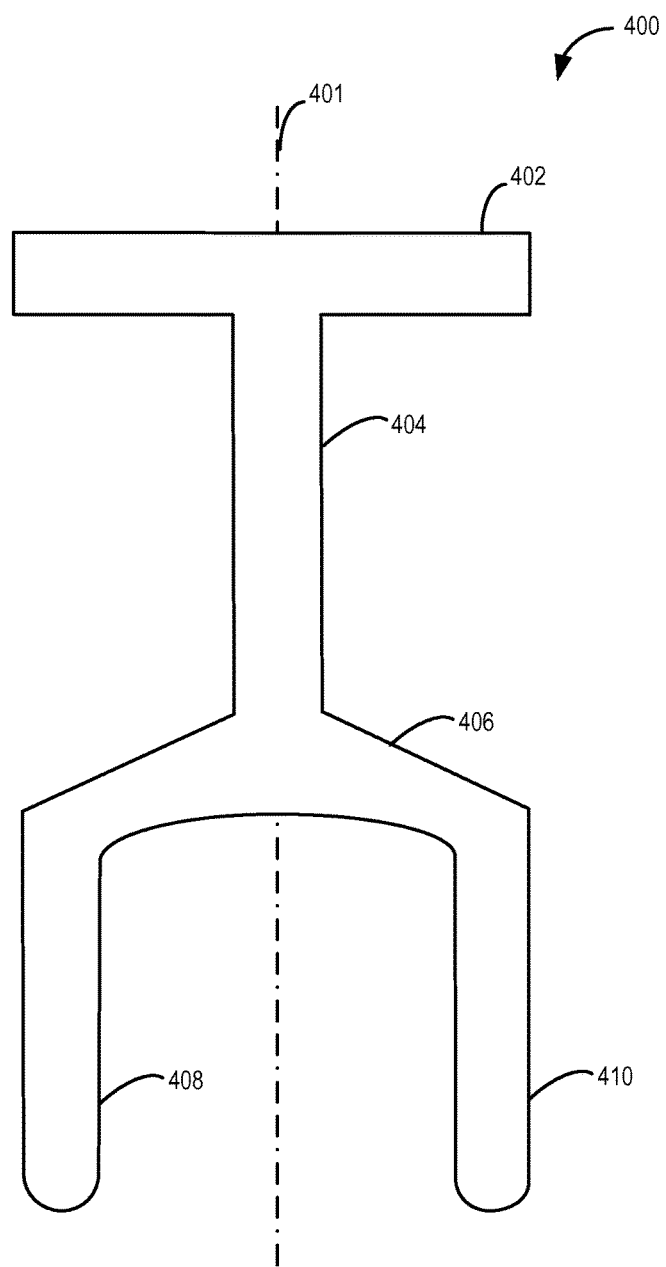
FIG. 4 shows an example embodiment for a fastening tool to install the adaptor of FIG. 2.

Turning now to FIG. 4 is an example embodiment of a fastening tool 400 having a handle 402, a shaft 404, and a first prong 408 and a second prong 410 connected via a bridge piece 406. As depicted, handle 402 may including a first arm 420 and a second arm 422 extending laterally from a central axis 401. The handle 402 is configured to allow a user performing the leak detection test to grip onto the handle 402 to allow twisting for the fastening tool 400 in a first direction (e.g., clockwise) and/or a second direction (e.g., counter-clockwise). In one example, the handle 402 may have a plurality of ridges (not shown) to enable a firmer grip by the user. Although the handle 402 is shown having the first arm 420 and the second arm 422 in the current embodiment, alternative embodiments may be appreciated, such as an annular handle allowing circumferential rotations of the fastening tool 400.

The handle 402 may be operably and irreversibly coupled to a top end of shaft 404 at a location substantially in a center area between the first arm 420 and the second arm 422 of the handle 402. The shaft may comprise a length that allows stable and firm manipulation of the fastening tool 400 by the user. At a bottom end of the shaft 404 opposite the top end attached to the handle 402 is the bridge piece 406, which splits the fastening tool 400 into the first prong 408 and the second prong 410.

In one embodiment, each end of the first prong 408 and the second prong 410 may be sized to fit snugly and securely within each of the fastener points in order to reversibly engage with each of the fastener points (first fastener point 291, second fastener point 293, third fastener point 295, and/or fourth fastener point 297), described in reference to FIGS. 2-3. In another embodiment, each of the first prong 408 and the second prong 410 may be threaded at an end (not shown). In yet alternative embodiments, other engagement mechanisms that allow stable and reversible engagement between the fastening tool 400 and any of the aforementioned fastener points may be provided. As such, the ends of each of the first prong 408 and the second prong 410 may be complementary to the interior surfaces of each of the fastener points. In addition, each of a diameter of the first prong 408 and/or the second prong 410 may be less than the diameter of each of the first fastener point 291, second fastener point 293, third fastener point 295, and/or fourth fastener point 297. Thus, when first prong 408 and second prong 410 are each inserted into the first fastener point 291 and second fastener point 293 of the movable disc 288, and/or third fastener point 295 and fourth fastener point 297 of the end cylinder 280, the end of first prong 408 and the end second prong 410 may stably and reversibly engage with the interior surfaces of each fastener point. Consequently, rotations allowing movement of the movable disc 288 and/or end cylinder 280 along central axis 201 may be achieved when the fastening tool 400 is twisted in the first direction and/or the second direction.

Figure 5:
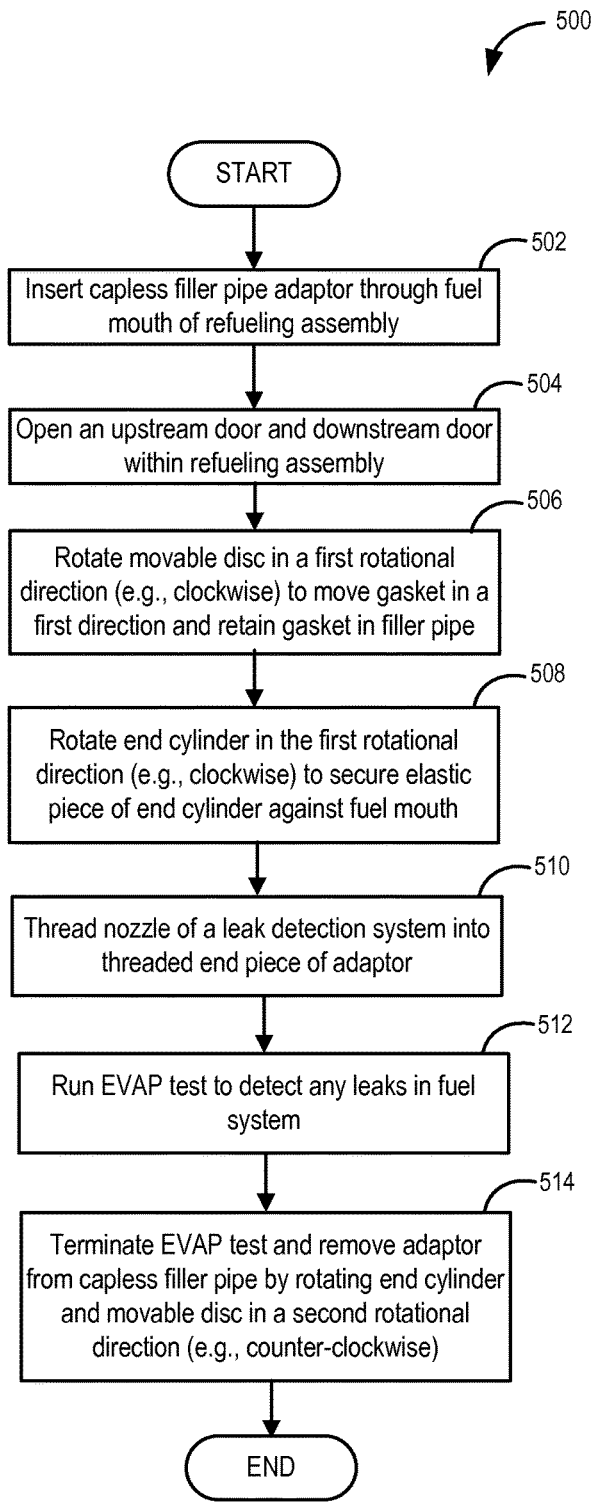
FIG. 5 shows an example method for evaporation leak detection testing using the adaptor of FIGS. 2-3.

Now turning to FIG. 5, an example method 500 for EVAP leak testing of a vehicle having a capless fuel tank filler pipe is provided using an adaptor, such as adaptor 260 of FIG. 2. At 502, the adaptor including a lower body (e.g., lower body 266 of FIG. 2), a threaded hollow shaft upstream of the lower body (e.g., hollow shaft 276 of FIG. 2), a lower stationary flange positioned between the lower bod and the hollow shaft (e.g., stationary flange 292 of FIG. 2), a movable disc threaded on the hollow shaft (e.g., movable disc 288 of FIG. 2), and a gasket downstream of the movable disc and upstream of the lower stationary flange (e.g., gasket 278 of FIG. 2), is inserted through the fuel mouth (e.g., fuel mouth 298 of FIG. 2) of a vehicle, such as vehicle system 6.

At 504, the lower body of the adaptor opens the upstream door and the downstream door (e.g., upstream door 210 and downstream door 226) and enters down the throat of the filler pipe (e.g., filler pipe 274 and refueling inlet 272). As such, the lower body applies a pushing force against each of the spring-biased upstream and downstream doors. In response, each of the upstream door and the downstream door rotates via its corresponding hinge (e.g., hinge 224 of upstream door 210 and hinge 228 of downstream door 226) to open the filler pipe.

Concomitantly, the gasket may contact and abut against the walls of the filler pipe and refueling inlet. At 506, the movable disc upstream of and in face-sharing contact of the gasket is rotated in a first rotational direction (e.g., clockwise) around the threaded hollow shaft of the adaptor. Rotations in the first rotational direction result in a force exerted on the gasket in a first direction (e.g., first direction 203 substantially along central axis 201 shown in FIG. 2). In other words, rotation of the movable disc pushes the gasket to move only axially along the threaded hollow shaft towards the lower stationary flange (e.g., stationary flange 292). In one embodiment, the stationary flange may act as a stop seal that may prevent further movement by the gasket along the central axis (e.g., central axis 201). In one example, the rotations may be provided by a fastening tool, such as fastening tool 400, for example, that engages securely and reversibly with the fastener points (e.g., first fastener point 291 and second fastener point 293) on the top surface (e.g., top surface 286). As a result, the gasket may be securely retained in the refueling assembly by forming an airtight seal between the adaptor via the gasket and the walls of the filler pipe.

At 508, the end cylinder (e.g., end cylinder 280) having the elastic piece (e.g., elastic piece 290) upstream of the movable disc and the gasket may be threaded, or rotated, onto the hollow shaft of the adaptor. As such, the end cylinder may contact and abut against an inner circumference of the fuel mouth (e.g., fuel mouth 298), such that the elastic piece fits at least partially within the inner circumference of the fuel mouth to form an airtight seal.

Like the gasket at 506, rotations of the end cylinder may be achieved via a plurality of fastener points (e.g., third fastener point 295 and fourth fastener point 297) on the surface of the end cylinder. The third and fourth fastener points are securely and reversibly engaged by the fastening tool, for example, and rotated in the first direction (e.g., clockwise) along the hollow shaft. As a result, the force created by the rotations of the end cylinders towards the fuel mouth may create an airtight seal between the adaptor and the fuel mouth. In other words, rotation of the movable disc via engagement of the third fastener point and the fourth fastener point on the top surface (e.g., top surface 296 of FIGS. 2 and 3) of the end cylinder with the fastening tool allows the end cylinder to rotate around and move axially along the threaded hollow shaft substantially along central axis (e.g., central axis 201) towards the lower flange (e.g., stationary flange 292). As a result, tightening of a seal formed between the fuel mouth and the elastic piece may be provided. In this way, a first airtight coupling between the filler pipe and the gasket, and a second airtight coupling between the fuel mouth and the end cylinder may each be formed to ensure a reliable seal between the adaptor and the fuel tank. Thus, only a desired flow path (e.g., flow path 207) is established between the leak detection system and the fuel tank during leak testing. In other words, the example method described above may enable the fuel tank to hold a desired pressure or vacuum for the duration of the leak testing.

At 510, a nozzle of a leak detection system (e.g., nozzle 304 of leak detection system 302 of FIG. 3A), such an EVAP testing machine, may be threaded into the threaded top end of the adaptor (e.g., threaded top end 262 of adaptor 260). The nozzle may be threaded to the adaptor via a series of screw threads (e.g., screw threads 312 of FIG. 3A) on an inner surface of the threaded top end (e.g., inner surface 310 of the threaded top end 262, as discussed in reference to FIG. 3A). The nozzle is also be coupled to a pressure/vacuum supply hose via an opposite, second end of the nozzle. As such, the pressure/vacuum supply hose is coupled to a source of pressure or to a source of vacuum.

Thus, at 512, an EVAP test (or other similar leak detection test) may be run. For example, a vapor or gas may be delivered under pressure by a smoke generator to or a vacuum can be created within the fuel tank and its associated vapor lines (e.g., vapor recovery line 21, conduit 71, conduit 73, and/or conduit 75) via the continuous flow path. The continuous flow path of gas or vacuum may flow is established only through the adaptor between the pressure or vacuum source and the filler pipe of the fuel tank. In one example, once the fuel tank is pressurized, the fuel tank (and its fuel lines and components) are monitored for leaks by conventional testing methods such as, for example, by visually detecting escape of smoke from a leak or by performing a mechanical pressure-decay test.

At 514, the EVAP test may be terminated. As such, at the conclusion of the leak testing process, the nozzle is detached the adaptor via threading in a second rotational direction (e.g., counterclockwise). End cylinder is rotated in the second rotational direction via the third and fourth fastener points around the threaded hollow shaft to cause the end cylinder to ride over the threaded hollow shaft and move away from the fuel mouth. Similarly, movable disc is rotated in the second rotational direction via the first and second fastener points around the threaded hollow shaft to cause the removable disc to ride over the threaded hollow shaft and move away from the filler pipe. In turn, the gasket is released.

Accordingly, the former air-tight seal created between gasket and the filler pipe, and the end cylinder and the fuel mouth of the refueling assembly is broken to permit the adaptor to be withdrawn from the filler pipe. With the adaptor withdrawn from the filler pipe, the spring-biased upstream door and downstream door will automatically rotate to their normally closed, position extending across the throat of the filler pipe.

In this way, reversibly airtight seals may be formed between the adaptor at a first location (e.g., between the end cylinder of the adaptor and the fuel mouth) and at a second location (e.g., between the gasket of the adaptor and the filler pipe). As a result, the adaptor may restrict gas flow only through the defined flow path through the adaptor, and not through any other flow paths when adaptor is substantially positioned and fastened within refueling assembly during leak detection testing. Thus, the systems and methods disclosed herein may provide an effective and efficient means to perform EVAP testing, for example. Further, because the end cylinder may be arranged at least partially within the fuel mouth and the nozzle of the leak detection system threads into the threaded top end, a projection of the adaptor out away from the fuel mouth may be reduced. This reduction in outward projection of the adaptor disclosed is desirable in certain hybrid plug-in vehicles, where an outward-projecting adaptor may decrease ease of leak testing.

Note that the example method included herein can be used with various engine and/or vehicle system configurations. Further, the various actions, operations, and/or functions illustrated may be performed in the sequence illustrated, in parallel, or in some cases omitted. Likewise, the order is not necessarily required to achieve the features and advantages of the example examples described herein, but is provided for ease of illustration and description. One or more of the illustrated actions may be repeatedly performed depending on the particular strategy being used.

Thus, in an embodiment, a method for detecting leaks in a capless fuel tank having a filler pipe of a motor vehicle may be provided, comprising securing an adaptor in the filler pipe, the adaptor including a hollow shaft having a threaded top end, wherein the hollow shaft is inserted through a fuel mouth of the filler pipe, a gasket arranged on the hollow shaft, wherein a position of the rubber gasket is adjustable only along a longitudinal length of the hollow shaft, and an end cylinder having an elastic piece threaded on the hollow shaft configured to create a seal on the fuel mouth, attaching a nozzle of a leak detection system to the adaptor via threading the nozzle to the threaded top end of the hollow shaft, and flowing a vapor through the nozzle of the leak detection system and through the adaptor into the filler pipe and fuel tank to test a presence of a leak in the fuel tank and one or more vapor lines.

In one example, the adaptor may also comprise a movable disc threaded on the hollow shaft upstream of the rubber gasket. In this example, the position of the rubber gasket along a longitudinal length of the hollow shaft may be adjusted by rotating the disc to move along the hollow shaft.

Further, securing the adaptor in the filler pipe may further include displacing an upstream door and a downstream door positioned across the filler pipe with the adaptor. Moreover, adjusting the position of the rubber gasket along the longitudinal length of the hollow shaft may comprise rotating one or more fastener points of a top surface of the movable disc to retain the adaptor in the filler pipe. Creating the seal between the fuel mouth and the end cylinder having the rubber piece may be achieved via rotating one or more fastener points on a top surface of the end cylinder so that the rubber piece is positioned at least partially within the fuel mouth.

In another embodiment, an adaptor for a capless fuel tank of a vehicle may be provided, comprising a main body including an upper hollow tube operably coupled to a lower cylinder, the main body inserted through a fuel mouth of a filler pipe of the capless fuel tank, a gasket threaded on near a first end of the upper hollow tube, wherein a position of the rubber gasket is adjustable only along a longitudinal length of the upper hollow shaft, a movable disc threaded on upstream of the rubber gasket on the upper hollow tube and configured to exert a force on the gasket towards the fuel tank, and an annular end cover having an elastic portion threaded on an opposite, second end of the upper hollow tube configured to create an air-tight seal on the fuel mouth.

In one example, the second end of the upper hollow tube may be threaded on an inner surface and may receive a nozzle of a leak detection system. Further, the annular end cover having the elastic portion may be angled at a lower end of the annular end cover in order to form the airtight seal within the fuel mouth. In another example, the position of the rubber gasket only along the longitudinal length of the upper hollow tube may be adjustable by rotating the movable disc around the upper hollow tube. Moreover, the main body may comprise a length sufficient to engage and displace an upstream door and a downstream door positioned across the filler pipe.

In another representation, a system may comprise: a vehicle having a capless fuel tank filler pipe; and an adaptor for the vehicle, comprising a hollow shaft having a threaded top end, the hollow shaft inserted through a mouth of a filler pipe of a fuel tank; a gasket arranged on the hollow shaft, wherein a position of the gasket is adjustable only along a longitudinal length of the hollow shaft; and an end cylinder having an elastic piece threaded on the hollow shaft to create a seal with the fuel mouth.

Additionally, the use of an adaptor for testing a capless fuel filler pipe of a vehicle is provided, where the adaptor comprises a hollow shaft having a threaded top end, the hollow shaft inserted through a mouth of a filler pipe of a fuel tank, a gasket arranged on the hollow shaft, wherein a position of the gasket is adjustable only along a longitudinal length of the hollow shaft; and an end cylinder having an elastic piece threaded on the hollow shaft to create a seal with the fuel mouth.

In combination with any of the above systems, adaptors, or methods of use, the position of the gasket along the longitudinal length of the hollow shaft is adjusted via a movable disc threaded on the shaft, the movable disc configured to rotate and exert a force on the gasket.

In combination with any of the above systems, adaptors, or methods of use the hollow shaft is operably coupled to a lower body, and wherein the hollow shaft and lower body coupled together comprise a length sufficient to engage and displace an upstream door and a downstream door positioned across the filler pipe.

In combination with any of the above systems, adaptors, or methods of use, the threaded top end of the hollow shaft includes a series of interior screw threads on an inner surface of the threaded top end.

In combination with any of the above systems, adaptors, or methods of use, the hollow shaft includes a series of exterior screw threads on an outer surface of the hollow shaft.

In combination with any of the above systems, adaptors, or methods of use, the end cylinder having the elastic piece is angled at a lower end of the end cylinder forming the seal within the fuel mouth.

In combination with any of the above systems, adaptors, or methods of use the end cylinder having the elastic piece is adjusted to rotate along the hollow shaft, and wherein the elastic piece of the end cylinder is fastened within the fuel mouth.

In combination with any of the above systems, adaptors, or methods of use, the threaded top end of the hollow shaft receives a nozzle of a leak detection system.

In combination with any of the above systems, adaptors, or methods of use, the elastic piece is fastened in the fuel mouth via one or more fastener points on a top surface of the end cylinder having the elastic piece using a fastening tool.

In combination with any of the above systems, adaptors, or methods of use, the movable disc exerts the force on the rubber gasket via rotations at one or more fastener points on a top surface of the movable disc using the fastening tool.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for detecting leaks in a capless fuel tank having a filler pipe of a motor vehicle, comprising:
   securing an adaptor in the filler pipe, the adaptor including a hollow shaft having a threaded top end, wherein the hollow shaft is inserted through a fuel mouth of the filler pipe, a rubber gasket arranged on the hollow shaft, wherein a position of the rubber gasket is adjustable only along a longitudinal length of the hollow shaft, and an end cylinder having an elastic piece threaded on the hollow shaft configured to create a seal on the fuel mouth;
   attaching a nozzle of a leak detection system to the adaptor via threading the nozzle to the threaded top end of the hollow shaft;
   flowing a vapor through the nozzle of the leak detection system and through the adaptor into the filler pipe and the fuel tank; and
   wherein creating the seal between the fuel mouth and the end cylinder having the elastic piece is achieved via rotating one or more fastener points on a top surface of the end cylinder so that the elastic piece is positioned at least partially within the fuel mouth.

2. The method of claim 1, wherein the adaptor further comprises a movable disc threaded on the hollow shaft upstream of the rubber gasket, and wherein the position of the rubber gasket along the longitudinal length of the hollow shaft is adjusted by rotating the disc to move along the hollow shaft.

3. The method of claim 2, wherein securing the adaptor in the filler pipe further includes displacing an upstream door and a downstream door positioned across the filler pipe with the adaptor.

4. The method of claim 2, wherein adjusting the position of the rubber gasket along the longitudinal length of the hollow shaft comprises rotating one or more fastener points of a top surface of the disc to retain the adaptor in the filler pipe.

5. A method for detecting leaks in a capless fuel tank having a filler pipe of a motor vehicle, comprising:
   securing an adaptor in the filler pipe, the adaptor including a hollow shaft having a threaded top end, wherein the hollow shaft is inserted through a fuel mouth of the filler pipe, a rubber gasket arranged on the hollow shaft, wherein a position of the rubber gasket is adjustable only along a longitudinal length of the hollow shaft, and an end cylinder having an elastic piece threaded on the hollow shaft configured to create a seal on the fuel mouth;

attaching a nozzle of a leak detection system to the adaptor via threading the nozzle to the threaded top end of the hollow shaft;

flowing a vapor through the nozzle of the leak detection system and through the adaptor into the filler pipe and the fuel tank;

wherein the adaptor further comprises a movable disc threaded on the hollow shaft upstream of the rubber gasket, and wherein the position of the rubber gasket along the longitudinal length of the hollow shaft is adjusted by rotating the disc to move along the hollow shaft; and wherein adjusting the position of the rubber gasket along the longitudinal length of the hollow shaft comprises rotating one or more fastener points of a top surface of the disc to retain the adaptor in the filler pipe.

6. The method of claim 5, wherein securing the adaptor in the filler pipe further includes displacing an upstream door and a downstream door positioned across the filler pipe with the adaptor.

7. The method of claim 5, wherein creating the seal between the fuel mouth and the end cylinder having the elastic piece is achieved via rotating one or more fastener points on a top surface of the end cylinder so that the elastic piece is positioned at least partially within the fuel mouth.

8. A method for detecting leaks in a capless fuel tank having a filler pipe of a motor vehicle, comprising:

securing an adaptor in the filler pipe, the adaptor including a hollow shaft having a threaded top end, wherein the hollow shaft is inserted through a fuel mouth of the filler pipe, a rubber gasket arranged on the hollow shaft, wherein a position of the rubber gasket is adjustable only along a longitudinal length of the hollow shaft, and an end cylinder having an elastic piece threaded on the hollow shaft configured to create a seal on the fuel mouth, wherein the end cylinder has one or more fastener points on a top surface of the end cylinder and the elastic piece is angled relative to a central axis such that the end cylinder comprises a trapezoidal cross-section;

attaching a nozzle of a leak detection system to the adaptor via threading the nozzle to the threaded top end of the hollow shaft; and flowing a vapor through the nozzle of the leak detection system and through the adaptor into the filler pipe and the fuel tank.

9. The method of claim 8, wherein the adaptor further comprises a movable disc threaded on the hollow shaft upstream of the rubber gasket, and wherein the position of the rubber gasket along the longitudinal length of the hollow shaft is adjusted by rotating the disc to move along the hollow shaft.

10. The method of claim 9, wherein securing the adaptor in the filler pipe further includes displacing an upstream door and a downstream door positioned across the filler pipe with the adaptor.

11. The method of claim 9, wherein adjusting the position of the rubber gasket along the longitudinal length of the hollow shaft comprises rotating one or more fastener points of a top surface of the disc to retain the adaptor in the filler pipe.

12. The method of claim 8, wherein creating the seal between the fuel mouth and the end cylinder having the elastic piece is achieved via rotating the one or more fastener points on the top surface of the end cylinder so that the elastic piece is positioned at least partially within the fuel mouth.

\* \* \* \* \*